UNITED STATES PATENT OFFICE.

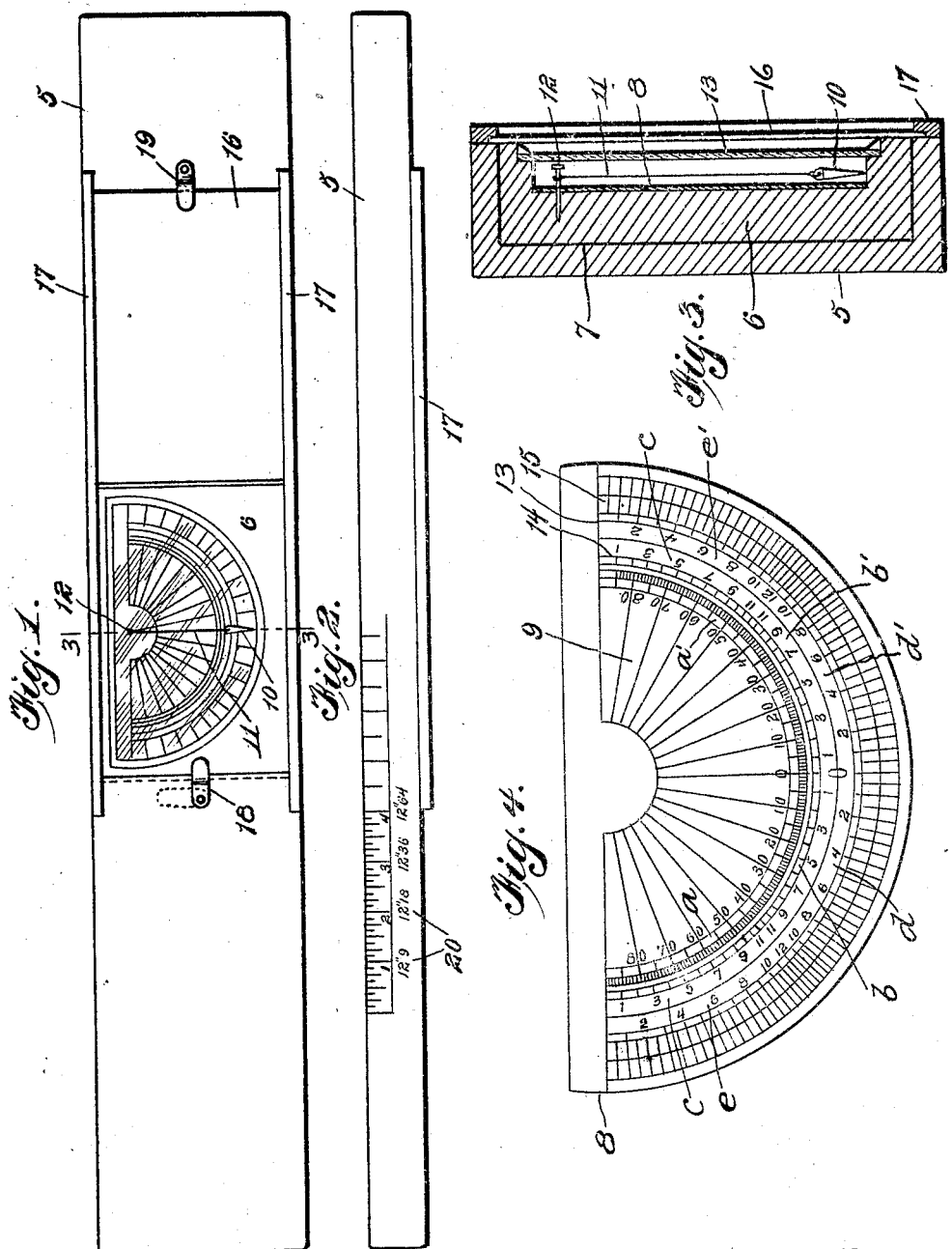

HENRY F. LOESCHNER, OF FREDERICKTOWN, MISSOURI.

PROTRACTOR-LEVEL.

1,382,923. Specification of Letters Patent. Patented June 28, 1921.

Application filed April 12, 1919. Serial No. 289,611.

*To all whom it may concern:*

Be it known that I, HENRY F. LOESCHNER, a citizen of the United States, residing at Fredericktown, in the county of Madison and State of Missouri, have invented new and useful Improvements in Protractor-Levels, of which the following is a specification.

This invention relates to mechanic's instruments, and particularly to protractor levels.

The primary object of the invention is to provide an instrument of simple and improved construction for ascertaining levels, verticals and angles of flat, upright or slanting surfaces, and the scale for such instrument is so graduated and marked as to enable the user to readily determine the secant, sine and cosine of any angle.

A further and particular object of the invention is to provide an instrument of the character stated which is embodied in a level beam of the usual well known construction, but which may be quickly and easily detached or removed from the beam so as to be used independently thereof as a separate and smaller level, thus providing in a single instrument two levels of different sizes.

With these and other objects in view, the invention consists in the novel construction, combination and arrangement of parts, all as will be described more fully hereinafter, illustrated in the drawing, and particularly pointed out in the claims.

In the drawing:—

Figure 1 is a side elevation of a protractor level constructed in accordance with the invention, Fig. 2 is a top plan view of the level, Fig. 3 is a vertical transverse sectional view taken through the level and indicating instrument on the plane indicated by the line 3—3 of Fig. 1, and Fig. 4 is an enlarged plan view of the protractor scale used in connection with the level.

Referring now to the drawing, 5 indicates generally a level beam or stock of ordinary construction, having its upper and lower edges or faces parallel, and these edges may be graduated in the ordinary manner.

The level and angle determining and measuring instrument is embodied in a small level beam or stock embodying a block or casing indicated at 6, and this casing fits snugly within a chamber or recess 7 formed in one side of the beam 5. It is preferred that the recess be located intermediate the ends of the beam, and it is also preferred that the casing and the opening to receive the same be of the same rectangular shape and size so that movement of the casing within such opening will be prevented. The casing is of such thickness that its outer face will lie in the same plane with the level side when inserted properly within the recess or chamber.

The outer face of the block is recessed and this recessed portion receives the dial protractor card or plate 8. This card is semi-circular in shape and is provided with a scale indicated at 9 to indicate the degrees of a circle. It will be observed, particularly with reference to Fig. 4 of the drawing, that the zero line of the protractor scale is disposed at right angles to the upper and lower edges of the level beam, and the scale markings appearing upon each side of this zero line are indicated by tens up to 90°. A gravity indicator such as the plumb bob 10 is arranged within the block recess and the supporting cord or rod 11 of this indicator is secured to a pin or spike 12 passing through the card at the center from which the indicator arcs are struck. A glass plate or other transparency 12' closes the recess and prevents the plumb bob or gravity indicator becoming removed from the casing, and at the same time permits of the indications being easily read by the operator or mechanic.

The dial, protractor plate or card 8 is provided with sets of concentric scales 13, 14 and 15 for coöperation with the pointer 10. The scale 13 constitutes the degree scale proper and comprises the arcs $a$ and $a'$ extending at opposite sides of the zero point and each having scale markings indicated by tens and running in opposite directions from the zero point. When the pointer 10 registers with the common zero point of these scale arcs, this will indicate that the level is perfectly horizontal, *i. e.*, level. On the other hand if the pointer 10 should register with the 90° mark of either of said arcs, this will indicate that the level is perpendicular or plumb. When the index or pointer is on the 45° mark of either of said arcs, this will indicate that the slant of the level is 45 degrees. The graduations on the scales 14 and 15 indicate inches, and the scale 14 includes the arcs $b$, $b'$ and $c$, $c'$, while the scale 15 includes the arcs $d$, $d'$ and $e$, $e'$. The arcs $b$, $b'$, are alike in character and arranged on opposite sides of the common zero point of the scales, and the scale graduations of each of said arcs are designated by odd numbers 1, 3, 5, 7, 9, 11, in a scale range of 12 inches. As shown, the numerals 1 of each set of numerals of the arcs $b$, $b'$ begin at points about opposite the $3\frac{3}{4}°$ graduations of the degree arcs $a$, $a'$ and the numerals 11 thereof terminate about opposite the $41\frac{1}{4}°$ graduations of the arcs $a$, $a'$; and the graduations of the arcs $b$, $b'$ decrease in width as they run from 1 to 11 and the distance between such numerals proportionately decreases, making the two arcs $b$ and $b'$, polygon scales. The arcs $c$, $c'$, of the scale 14 are similarly alike in character, and the scale graduations of the same are correspondingly designated by odd numbers, but in a reverse order, i. e., 11, 9, 7, 5, 3, 1, in a scale range of 12 inches. As shown, the graduations of the arcs $c$ and $c'$ gradually increase in width outward from the point of connection with the arcs $b$ and $b'$, respectively, and these arcs $c$, $c'$, constitute reversed polygon scales. The arcs $d$, $d'$, of the scale 15 are arranged on opposite sides of the common zero point of the scale card, and the scale graduations thereof are designated by even numbers 2, 4, 6, 8, 10, 12, in a scale range of 12 inches, and as shown the numerals of each of the arcs begin at points about in line with the 10° indication of the arcs $a$, $a'$, of the scale 13, the scale graduations of the arcs $d$, $d'$, decreasing in width as they run from 2 to 12. Similarly the arcs $e$, $e'$, of the scale 15 are arranged on opposite ends of the arcs $d$, $d'$, and the scale graduations thereof are designated by even numbers, but in the reverse order, i. e., 12, 10, 8, 6, 4, 2, and gradually increase in width in their outward progression. The scale 15, and the several arcs thereof immediately adjacent the zero point, is arranged for the "laying off" of hip and valley rafters, and the numeral designated thereon by the pointer at any angle up to the 45° mark, will indicate the rise per run of one foot for plain rafter, or the rising pitch of the rafters for hips and valleys, while the outer opposite sets of arcs between the 45° and 90° marks give the reverse, or falling pitch per run of 1 foot.

The casing 6 is protected from injury by the sliding closure plate 16, the latter being confined between the guide members 17 near the upper and lower edges respectively of the beam 5. The plate 16 may be of thin metal, and slides freely within its guides. When the slide is moved over the block or casing 6 the latter will be wholly covered and obstructed from view, and will also be protected against injury. The slide is limited in its movement in one direction by the spring metal stop member or clip 18 and in its movement in the reverse direction by the spring metal stop or clip 19. The clip 18 is preferably pivotally mounted upon the beam 5, and in addition to forming a stop for the slide 16, also acts as means for retaining the casing or block 6 in position within its recess in the beam 5. When it is desired to remove the block 6 from the casing or main level beam or stock the clip 18 may be swung to the position shown in dotted lines in Fig. 1, whereupon the block may be easily removed. It is to be noted of the device thus provided, that, the block 6, when removed, is capable of performing all the functions of the same, as when positioned in the main level beam 5, but, by reason of its smallness, may be used on work too small for the larger and longer beam, and it is contemplated having both side and end edges of each beam or block 5 and 6 a true straight edge, so that either may be used with any one of the four sides and end edges against the work with an equal degree of accuracy.

The upper longitudinal edge of the beam or stock 5 is provided with an inch scale running to 24 inches, or 2 feet, and opposite each inch graduation is arranged the corresponding length, in feet and inches of decimal figures, of common rafters, the length scale running up to the $\frac{1}{2}$ pitch mark, i. e., the 12 inch mark of the inch scale, for each one inch rise. This scale of rafter lengths may be continued up the inch scale to full pitch or the 24 inch mark or graduation, as may be desired, and is provided to give the mechanic, making use of the device, complete data for the laying off of rafters without the necessity of figuring the length and cuts required or losing time in referring to tables of such data. When the level is used, and the inch rise in falling or rising pitch is read on the protractor cord, by referring to the inch scale the required length of rafter may be read opposite the number of inches corresponding to the reading obtained.

While the above is a description of the preferred embodiment of the invention, it will be understood that alterations may be made in the minor details of construction without departing from the spirit of the invention as defined by the claims.

Having thus fully described my invention, I claim:—

1. A compound protractor level comprising a main beam having a recess formed therein in one side thereof, a secondary beam seated in the recess of said main beam and adapted to be removed therefrom for use independently of the latter, means for securing said secondary beam in position within the recess of said main beam, and a closure slidably mounted on said main beam and adapted to be moved into registry with the recess of the latter to close the same and to protect the secondary beam from injury when seated in the recess.

2. A compound protractor level comprising an elongated main beam having a longitudinally elongated recess formed therein in one side and medially of the opposite ends thereof, a secondary beam snugly seated in said elongated recess of said main beam and adapted to be removed therefrom for use independently of the latter, means for retaining said secondary beam in position within said elongated recess, a graduated scale and indicating pointer associated one with the other carried by said secondary beam, and a closure slidably mounted on said main beam and adapted to be moved into registry with said elongated recess to close the same and protect the secondary beam from injury when seated in said elongated recess.

In testimony whereof I affix my signature.

HENRY F. LOESCHNER.